United States Patent [19]
Sano et al.

[11] 3,793,028
[45] Feb. 19, 1974

[54] PHOTOGRAPHIC MATERIAL

[75] Inventors: Kazuya Sano; Seiki Sakanoue, both of Kanagawa, Japan

[73] Assignee: Fuji Photo Film Co., Ltd., Kanagawa, Japan

[22] Filed: Nov. 6, 1972

[21] Appl. No.: 303,757

[30] Foreign Application Priority Data
Nov. 4, 1971 Japan .................. 46-87792

[52] U.S. Cl. .................. 96/77, 96/3, 96/29 D
[51] Int. Cl. .................. G03c 1/40, G03c 7/00
[58] Field of Search .................. 96/3, 29 D, 77

[56] References Cited
UNITED STATES PATENTS

| | | | |
|---|---|---|---|
| 3,135,604 | 6/1964 | Green et al. | 96/3 |
| 3,230,085 | 1/1966 | Dershowitz et al. | 96/3 |
| 3,502,469 | 3/1970 | Bush et al. | 96/3 |

*Primary Examiner*—J. Travis Brown
*Assistant Examiner*—Richard L. Schilling
*Attorney, Agent, or Firm*—Sughrue, Rothwell, Mion, Zinn & Macpeak

[57] ABSTRACT

A silver halide type photographic material to be used in a diffusion transfer process characterised by the inclusion of a compound represented by the following formula (I):

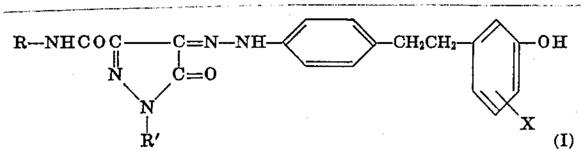

(I)

(wherein R is alkyl group containing 4–7 carbon atoms, X is a hydroxyl group located in the ortho- or para-position to the ring hydroxyl group, and R' is an ortho-chlorophenyl group).

14 Claims, 3 Drawing Figures

PHOTOGRAPHIC MATERIAL

BACKGROUND OF THE INVENTION

1. Field of the Invention

The present invention relates to a photographic material, and is particularly concerned with a light-sensitive material used in a diffusion transfer process.

2. Description of the Prior Art

Methods are known where a diffusion transfer image is obtained by the use of a dyestuff developer. The term "dyestuff developer" as is used herein is meant to include a dyestuff having at least one radical or group capable of developing a light-exposed silver halide. Such a dyestuff developer is originally soluble in an alkaline medium, but it becomes insoluble in an alkaline medium when it undergoes oxidation upon development of a light-exposed silver halide. A typical example of such a radical or group is an hydroquinone group.

The reason why the picture image is obtainable with the use of such a dyestuff in the diffusion transfer process can be explained as follows. When a negative light-sensitive material containing a dyestuff developer is exposed to light and subsequently treated with a liquid containing an alkali in order to develop the silver halide in the negative material using the dyestuff developer, the dyestuff developer is insolubilized in the exposed portion at the time of development of the silver halide. The dyestuff developer in unexposed portions remains soluble in an alkaline medium so that it is possible to form a picture image by placing a positive material containing a dyestuff-receiving layer over the negative material to thereby transfer it to the positive layer, forming a positive image.

Accordingly, it is necessary, in order to obtain color reproductivity of high fidelity, that the dyestuff developer transferred should have good spectral absorption characteristics. For instance, in the case of reproducing a natural color by the use of a combination of three dyestuff developers which absorb blue, green and red, respectively, the absorption curves of the three dyestuffs should not have an excessive overlap or gap (or leak) therebetween. In other words, a desired absorption curve should be in such that it has a maximum absorption peak at a certain desired wave length and the value of the absorption sharply decreases as the value of the wave length slides towards the adjacent absorption curves of other dyestuffs.

In the case of a yellow dyestuff, an absorption maximum at a too short wave length is hard to see, and an absorption maximum at too long a wave length imparts a reddish tinge. This reddish tinge is greatly influenced by a difference in the degree of absorption in the area of 500mμ, and the greater the degree of absorption, the deeper the reddish tinge.

From such a result, it can be seen that a yellow dyestuff having the most desirable absorption is one having its maximum absorption in the vicinity of 430–450mμ and a small absorption in the area of 500mμ.

SUMMARY OF THE INVENTION

We, the inventors, as a result of extensive studies to provide a yellow dyestuff having the above-mentioned color characteristics, have reached the present invention.

The present invention relates to a silver halide photographic material to be used in a diffusion transfer process, which is characterised by the inclusion of a specific dyestuff developer represented by the following general formula (I).

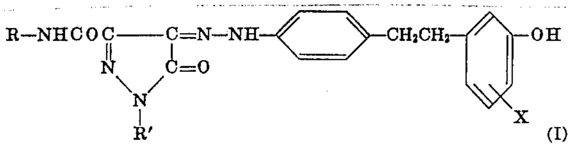

(I)

wherein R is alkyl group containing 4–7 carbon atoms, X is a hydroxyl group located either in the ortho- or para-position to the existing ring hydroxyl group, and R′ is an ortho-chlorophenyl group.

BRIEF DESCRIPTION OF THE DRAWINGS

The drawings are spectral absorption curve of compounds within the present invention as compared to various prior art compounds as described in the specification.

DETAILED DESCRIPTION OF THE INVENTION

Figure 1:
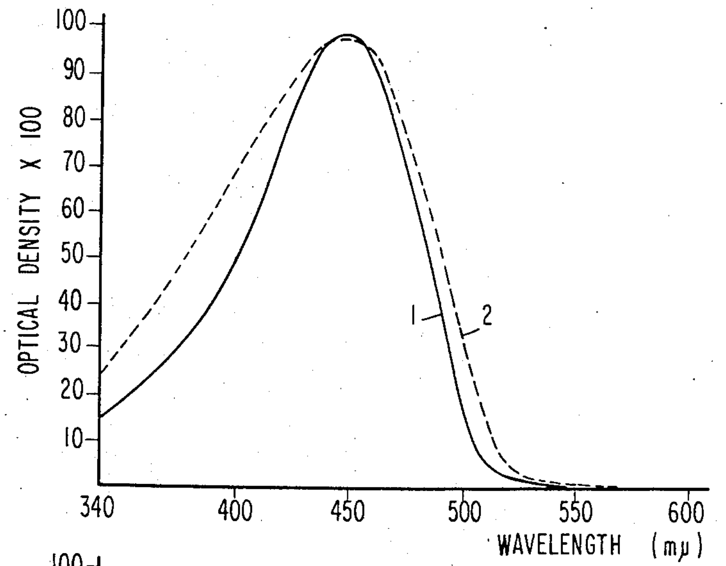

The compound represented by general formula (I) typically has as its R group a group such as a butyl, sec. butyl, isobutyl, pentyl, hexyl, heptyl, 4-methylpentyl, 2-ethylpentyl group or like linear or branched alkyl group, with R′ being a phenyl group which is substituted at least at the ortho-position with chlorine and which may be further substituted with an additional halogen group or groups an acylamino group etc.

It is to be specifically noted that no significant improvement in the overall properties of the compounds is obtained by introducing such other substituents nor, on the other hand, are the overall properties deleteriously effected. However, other substituents may be present, and additional examples thereof are alkyl groups such as the lower alkyl groups, e.g., a methyl group, an ethyl group, a propyl group, etc.; an alkoxy group such as lower alkoxy groups such as a methoxy group, an ethoxy group, a propoxy group, etc., a cyano group, a nitro group, an ethoxycarbonyl group, etc.

The electron accepting or electron donating property of such substituents does not affect the properties of the compound.

Thus, while no special benefit is to be gained from the optional substitution described, such is not excluded from the present invention.

Particular examples of such compounds include the following:

(1)

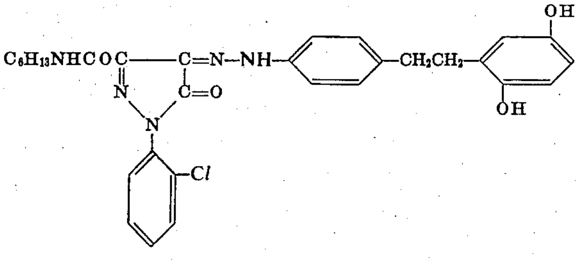

(2)

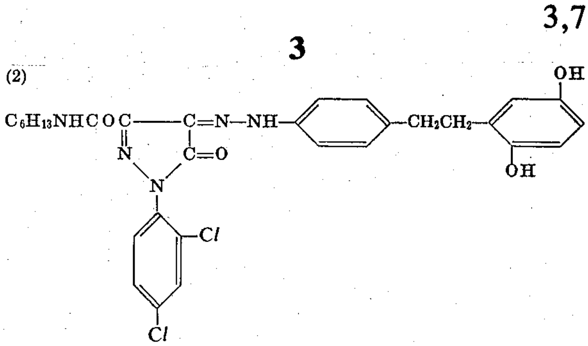

(3)

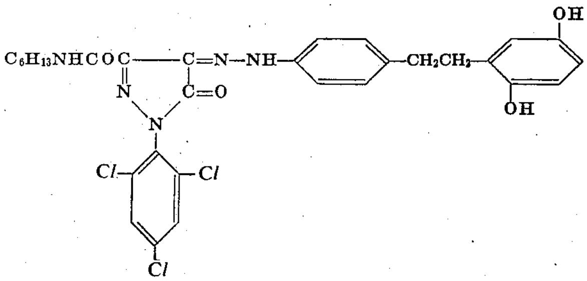

(4)

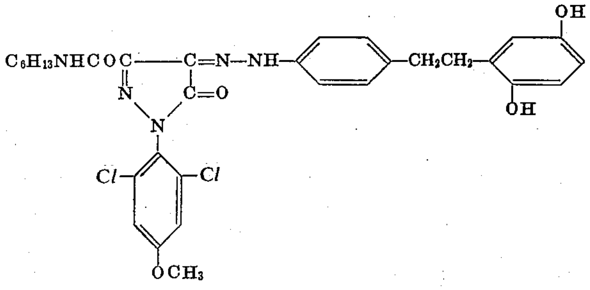

(5)

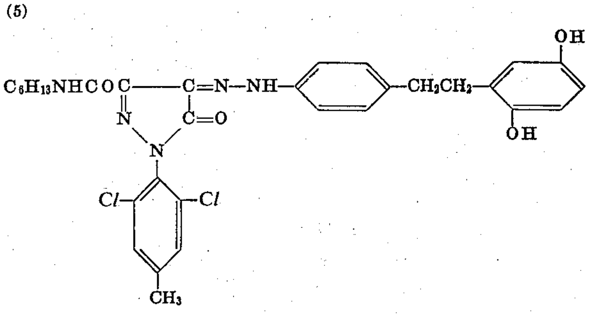

(6)

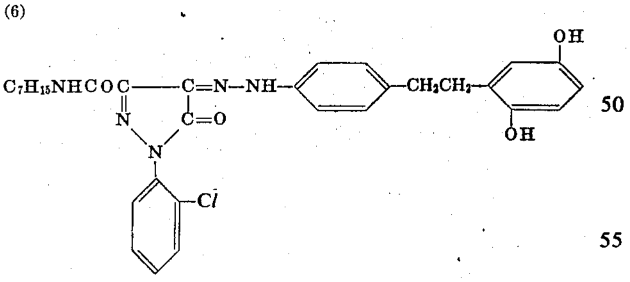

(7)

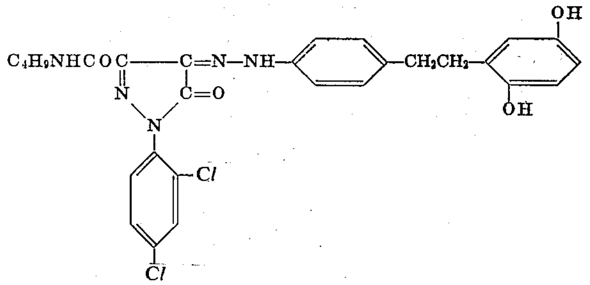

(8)

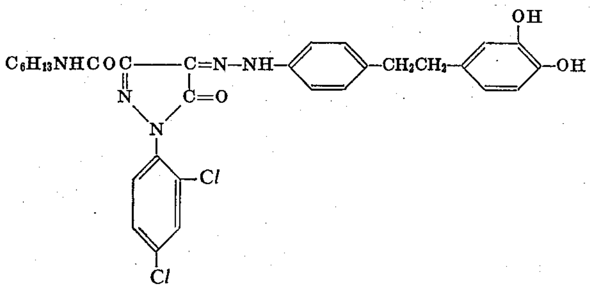

(9)

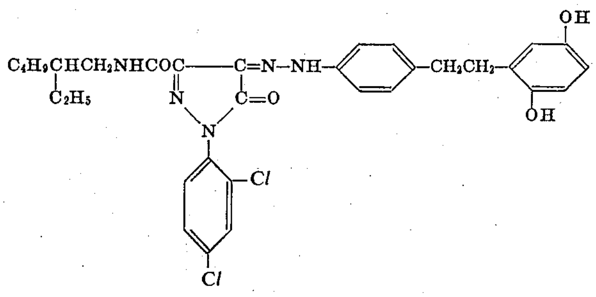

The synthesis of the compounds represented by the foregoing general formula (I) is effected, for example, in the following manner (see also U.S. Pat. No. 3,134,764):

A phenyl hydrazine derivative is first reacted with ethyl oxalacetate sodium salt to prepare a 1-(2-chlorophenyl derivative) substituted-5-pyrazolone-3-carboxylic acid ethyl ester, which is in turn reacted with an alkyl amine to form a 5-pyrazolone-3-carboxylic acid alkylamide derivative, which is in turn reacted with a 2,5- (or 3,4-) (diacetoryphenethyl aniline hydrochloride) diazonium salt followed by hydrolysis of the acetoxyl group of the resulting compound to give the desired compound.

The synthesis of the above-mentioned diacetoxyphenethylaniline hydrochloride (see U.S. Pat. No. 3,019,107) is carried out by firstly reacting at an elevated temperature p-nitrophenyl acetic acid, 2,5-dimethoxybenzaldehyde and piperidine to form 2,5-dimethoxy-4'-nitrostilbene, which is then hydrogenated in the presence of palladium-barium sulfate in ethyl acetate as the solvent to thereby give p-(2,5-dimethoxyphenethyl)aniline, which is further demethylated into p-aminophenethyl hydroquinone and acetylated at its hydroxyl group to finally give 2,5-diacetoxyphenethyl aniline. In a similar manner, 3,4-diacetoxyphenethyl aniline may be obtained.

Examples of the synthesis are illustrated hereinbelow:

Synthesis Examples

Synthesis of Compound (1)

a. Synthesis of 1-(2-chlorophenyl)-5-pyrazolone-3-carboxylic acid ethyl ester

A mixture of 70g of orthochlorophenyl hydrazine, 100g of ethyl oxaloacetate sodium salt and 50 ml. of ethanol was heated under reflux for an hour, then the mixture was combined with 40g of sodium ethylate and heated under reflux for an additional one hour, then cooled to room temperature. By pouring the cooled product into one liter of water containing 100 ml. of concentrated 35%, hydrochloric acid (hereafter the term "concentrated hydrochloric acid" means such acid), a syrupy reaction product was obtained. After decanting the supernatant layer which resulted, 100 ml. of acetonitrile was added to form crystals, which upon recrystallization from acetonitrile gave 55g of the ester having a melting point of 130°–131°C.

b. Synthesis of 1-(2-chloroethyl)-5-pyrazolone-3-carboxylic acid hexylamide

A mixture of 40g of the ester obtained in the above Synthesis a) with 30g of hexyl amine was stirred on an oil bath at 170°C while distilling off ethanol as it separated during reaction. After 4 hours, the reaction product was allowed to cool and the cooled product was washed twice with 500 ml. portions of water containing 50 ml. of concentrated hydrochloric acid to effect crystallization. Recrystallization of the resultant crystal from acetonitrile gave 24g of the desired product melting at 133°–135°C.

c. Synthesis of Compound (I)

To a suspension of 13g of 2,5-diacetoxyphenethyl aniline hydrochloride in 240 ml. water containing 6 ml. of concentrated hydrochloric acid, there was added dropwise at a temperature ranging from −3° to 0°C a solution of 2g of sodium nitrite in 30 ml. of water. The clear solution formed was stirred for another 10 minutes after dropping was discontinued and then neutralized with aqueous sodium acetate to a pH of 5–7. The resulting neutralized product was then added dropwise at a temperature ranging from 0° to 5°C to a solution comprising 12g of the compound obtained in Synthesis b) and 300 ml. of ethanol to thereby precipitate yellow crystals. After stirring for another 30 minutes from the completion of the dropwise addition, the crystals were recovered by filtration and recrystallized from ethanol. After the entire 12g of the resulting dyestuff was dissolved in 120 ml. of ethanol, the system was evacuated, combined with an aqueous solution comprising 12g of potassium hydroxide and 20 ml. of water and the resultant solution heated on a hot water bath under reduced pressure to effect hydrolysis of the acetoxy group. After 10 minutes, the resulting mixture was cooled and combined with 30 ml. of concentrated hydrochloric acid under reduced pressure to precipitate a crystalline product which was then recovered by filtration under normal pressure, washed with water, and recrystallized from a 1:1 (by volume) mixture of benzene-ethyl acetate to give 5.7g of Compound (1) having a melting point of 129°–132°C.

The elementary analysis of this compound was as follows:

| | C | H | N |
|---|---|---|---|
| Found | 64.21 | 5.75 | 12.35 |
| Calculated (as $C_{30}H_{32}O_4N_5Cl$) | 64.01 | 5.75 | 12.46 |

Synthesis of Compound (2)

a. Synthesis of 1-(2,4-dichlorophenyl)-5-pyrazolone-3-carboxylic acid ethyl ester Following the procedure of the synthesis of Compound (1) a) except for using the following materials, 126g of 2,4-dichlorophenyl hydrazine, 105g of ethyl oxaloacetate, 500 ml. of ethanol and 34g of sodium ethylate were reacted and the product formed was recrystallized from ethanol to give 69g of the desired ethyl ester melting at 150°C.

b. Synthesis of 1-(2,4-dichlorophenyl)-5-pyrazolone-3-carboxylic acid hexylamide In a manner similar to the case of synthesizing Compound (1) b), 116g of the ester obtained in the above Synthesis a) was reacted with 78g of hexylamine, and the product was poured into a liquid mixture comprising 100 ml. of methanol, 50 ml. of water and 50 ml. of concentrated hydrochloric acid, and then allowed to stand to precipitate crystals which upon recovery by filtration gave 47g of the desired compound melting at 170°C.

c. Synthesis of Compound (2)

The procedure employed for the synthesis of Compound (2) was carried out as described for the synthesis of Compound (1) but at a three-times larger scale using 39g of the pyrazolone coupling component to thereby prepare Compound (2). After recrystallization twice from acetone, there was obtained 15g of Compound (2) having a melting point of 220°C.

The elementary analysis of this compound was as follows:

| | C | H | N |
|---|---|---|---|
| Found: | 60.28 | 5.13 | 11.63 |
| Calculated (as $C_{30}H_{31}O_4N_5Cl_2$) | 60.40 | 5.20 | 11.74 |

Synthesis of Compound (4)

a. Synthesis of 1-(2,6-dichloro-4-methoxyphenyl)-5-pyrazolone-3-carboxylic acid ethyl ester Using the basic procedure for the synthesis of Compound (1) a), reaction was carried out using 77g of 2,6-dichloro-4-methoxyphenyl hydrazine, 78g of ethyl oxaloacetate sodium salt, 150 ml. of ethanol and 26g of sodium ethylate. After recrystallization from ethanol, there was obtained 39g of the pyrazolone having a melting point of 240°–245°C.

b. Synthesis of 1-(2,6-dichloro-4-methoxyphenyl)-5-pyrazolone-3-carboxylic acid hexylamide Following the basic procedure used to form Compound (1) b), 40g of the ethyl ester obtained in the above Synthesis a) was reated with 24g of hexylamine. After recrystallizing the product from acetonitrile, there was obtained 15g of 1-(2,6-dichloro-4-methoxyphenyl)-5-pyrazolone-3-carboxylic acid ethyl ester melting at 190°C.

c. Synthesis of Compound (4)

A diazo liquid, obtained according to the basic procedure used for the case of Compound (1) using 11.2g of 2,5-diacetoxyphenethyl aniline hydrochloride, 12 ml. of concentrated hydrochloric acid, 200 ml. of water and 2.2g of sodium nitrite was added dropwise at a temperature ranging from 0° to 5°C into a liquid mixture consisting of 14g of the coupler obtained in foregoing synthesis b) and 400 ml. of ethanol. The resinous product obtained was thoroughly washed with water, dried, dissolved in 160 ml. of ethanol and hydrolyzed with an aqueous alkaline solution consisting of 16g of potassium hydroxide and 40g water in a manner similar to the synthesis of Compound (1). The hydrolyzed product was then neutralized with 46 ml. of concentrated hydrochloric acid, filtered to recover the precipitate formed and then washed with water to give 6g of amorphous powder which softened at 90°–95°C.

The elementary analysis of this compound was as follows:

| | C | H | N |
|---|---|---|---|
| Found | 70.49 | 6.30 | 13.18 |
| Calculated (as $C_{31}H_{30}O_5N_5Cl_2$) | 70.72 | 6.27 | 13.30 |

Synthesis of Compound (6)

a. Synthesis of 1-(2-Chlorophenyl)-5-pyrazolone-3-carboxylic acid heptylamide

A mixture of 42g of 1-(2-chlorophenyl)5-pyrazolone-3-carboxylic acid ethyl ester (obtained according to the procedure of Synthesis a) of Compound (2)) with 40g of heptyl amine was heated to 170°C on an oil bath for 4 hours with stirring. The reacted mixture was washed several times with a 10% dilute hydrochloric acid and recrystallized from acetonitrile to give 30g of slightly yellow crystals melting at 133°C.

b. Synthesis of Compound (6)

According to the basic method described for the synthesis of Compound (1), 24g of 2,5-diacetoxyphenethyl aniline hydrochloride was diazotized, subjected to coupling with 24g of the coupler obtained in the above Synthesis a) and hydrolyzed to give crude compound (6), which was thereafter recrystallized twice from a 1:1 (by volume) mixture of benzene and ethyl acetate to yield 11g of Compound (6) melting at 126°–8°C.

The elementary analysis of this compound is given below:

| | C | H | N |
|---|---|---|---|
| Found | 64.66 | 5.84 | 12.27 |
| Calculated (as $C_{31}H_{34}O_4N_5Cl$) | 64.70 | 5.91 | 12.19 |

Following the procedure employed for synthesizing Compound (1), 20g of 4-(3,4-diacetoxyphenethyl)aniline hydrochloride (the method for the synthesis thereof is described in the specification of U.S. Pat. No. 3,019,254) was diazotized and coupled with 20g of 1-(2,4-dichlorophenyl)-5-pyrazolone-3-carboxylic acid hexylamide to give a crude acetoxy compound, which was subsequently hydrolyzed in a manner similar to the case of Compound (1). The crude product so obtained was recrystallized from acetonitrile to give 7g of Compound (8) melting at 162°–164°C.

The elementary analysis of this compound is as follows:

| | C | H | N |
|---|---|---|---|
| Found | 60.62 | 5.26 | 12.00 |
| Calculated (as $C_{30}H_{31}O_4N_5Cl_2$) | 60.40 | 5.20 | 11.74 |

These dyestuff developers to be used in the present invention are used by dispersing them either into a silver halide emulsion layer after being dissolved, for example, in a high boiling point solvent having a boiling point higher than 200°C such as dibutyl phthalate, tricresyl phosphate, trihexyl phosphate, N,N-diethyl octanamide, N,N-dimethyl laurylamide, etc., or throughout a layer provided adjacent to the silver halide emulsion layer on a support base. These developers may also be added to both such layers. The dyestuff developers are added to a blue-sensitive silver halide emulsion containing layer or a layer adjacent thereto. The blue-sensitive layer preferably contains from 5 to 30 mole percent of the total silver halide in the element. However, when used in a layer adjacent a silver halide layer, the layer is preferably adjacent the silver halide layer on the support base side (in a layer below the silver halide emulsion but toward the support).

The quantity of the dyestuff developer added varies depending upon the type of the silver halide emulsion to be used. For instance, in a color diffusion transfer photographic material, the molar ratio of the silver in the blue-sensitive silver halide emulsion layer to the dyestuff is from about 1.0 to about 15.0, preferably from about 1.5 to about 5.5. This ratio will also apply if the dyestuff developer is in the emulsion layer, in an adjacent layer, or spread between both layers, and will also apply in those cases where the blue-sensitive emulsion is present in a number of separate layers.

In the case where the only photosensitive layer of the diffusion transfer photographic material is a blue-sensitive silver halide, a silver/dyestuff developer molar ratio of at least 8:1 is especially desirable.

The silver halide photographic material used in the present invention includes ordinarily available emulsions containing silver chloride, silver bromide, silver iodide, silver chlorobromide, silver iodobromide etc., to which no particular modification has been made.

The emulsion or adjacent layer may be formed of any standard colloidal material as is used in this art, the most commonly used material being gelatin. Other well known equivalents such as polyvinyl alcohol, agar-agar, modified gelatins etc. may be used with success, and the exact choice is not overly critical.

These emulsions may be treated in a manner similar to those which have been heretofore applied to conventional emulsions, for example, by subjecting them, if desired, to chemical sensitizing or spectral sensitizing, and they may have added thereto anti-fogging agents, hardeners, coating aids, stabilizers and like additives as are known in the art.

Especially preferred materials include those as are disclosed in U.S. Pat. No. 3,537,849, e.g., a combination of a picolinium salt derivative and a hydroquinone derivative, for example, a combination of N-benzyl-α-picolinium bromide and 4'-methylphenyl hydroquinone is particularly useful as a developing accelerator for improving color separations of the transferred image. Also, it is desirable to incorporate developing stoppers as are disclosed in U.S. Pat. No. 3,260,597 into the image receiving layer in order to prevent color contaminations.

The compound used in this invention which is represented by general formula (I) seemingly resembles already known compounds such as those having general formulae (A) or (B):

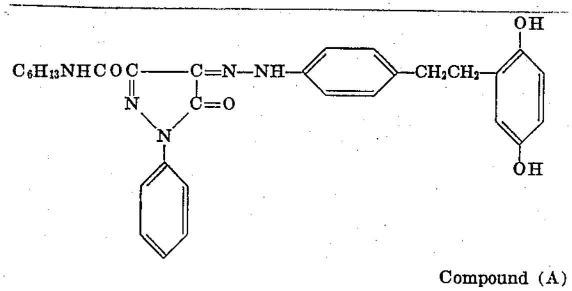

Compound (A)

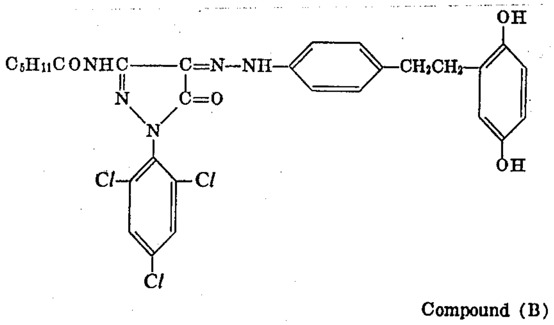

Compound (B)

However, the compounds of the present invention have outstanding advantages which cannot be attained or expected from the above known compounds. This fact will be clear, by referring to FIG. 1, in which the spectral absorption value of a methanol solution of heretofore described Compound (1) of this invention is plotted as curve 1 and that of Compound (A) is plotted as curve 2. By comparing these curves to each other, it is seen that Compound (A) has its maximum absorption peak at 450 m$\mu$ but is tinged with red because of an abundant absorption in the area of 500 m$\mu$. The spectral absorption was determined using 1 cm of cell path. The concentration of the compounds is as follows:

Curve 1: 0.0019g/100 cc methanol
Curve 2 & 3: 0.0021g/100 cc methanol
Curve 4: 0.0018g/100 cc methanol Despite the fact that Compound (1) of the invention shows a maximum absorption at the wave length of 450 m$\mu$, it develops a good color hue free from any reddish tinge because of the greatly decreased absorption near 500 m$\mu$. This result is believed attributable to the existence of at least one chlorine atom attached at the ortho-position of the aryl group linked with the 1-position N atom of the pyrazolone nucleus. This conclusion is also supported by the fact that the degree of the slope of curve 1 is no different from that of unsubstituted Compound (A) in the case the chlorine atom is attached to the para-position instead of the ortho-position, though its absorption maximum slightly shifts towards the longer wave length side, and by the fact that the absorption curve expands both skirts over outer wave lengths in the case a methoxy group is introduced in the orthoposition instead of the chlorine atom, while spreading the skirt towards a longer wave length and shifting the maximum absorption towards a shorter wave length.

Figure 2:
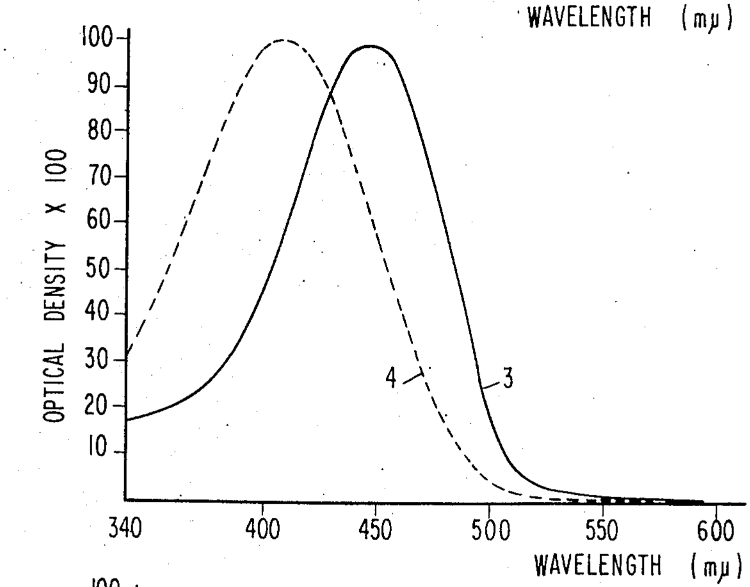

Referring now to FIG. 2, which is basically the same as FIG. 1 except it is a comparison of absorption profiles in methanol between Compound (3) of the present invention (curve 3) and Compound (B) (curve 4), it is seen that Compound (3) has a maximum absorption near 450 m$\mu$ and exhibits a good color hue, whereas Compound (B) has a maximum absorption near 410 m$\mu$, which is far too low to be practical.

This difference is apparently due to the reversed configuration of the acid amide linkage, as is seen from the structural formulae of the respective compounds.

It is quite surprising that such a marked difference is brought about by this slight change in the structure of the novel compound discovered by the inventors.

According to the present invention, it is now possible to provide a novel yellow dyestuff image having remarkably improved color hue, and hence it is possible to obtain an improved color diffusion transfer picture image.

The present invention will be hereinafter illustrated in greater detail by reference to several examples. All percentages in the examples are by weight unless otherwise indicated.

EXAMPLE 1

A light-sensitive layer was prepared according to the following procedure:

A solution of 2g of Compound (2) in a solvent mixture comprising 5cc of N,N-diethyl laurylamine and 5cc of methyl cyclohexanone was emulsified by dispersing it into 30 cc of an aqueous 10% gelatin solution containing 2cc of an aqueous 5% sodium n-dodecylbenzene sulfonate solution. The resulting emulsion was combined with 2cc of a 2% aqueous mucochloric acid solution and water in an amount sufficient to make the entire solution volume 100cc. The resulting emulsified solution was coated onto a cellulose triacetate film support which had previously been provided with an undercoat of gelatin, and then dried to a dry film thickness of 3.5 $\mu$. Onto this layer there was further provided a coating layer (final dry thickness 2$\mu$) of an emulsion mixture comprising 10g of a first emulsion prepared by emulsifying a solution of 1.0g of 4'-methyl phenyl hydroquinone in a solvent mixture of 2cc of N-n-butylacetanilide and 2cc of ethyl acetate into 10cc of an aqueous 10% gelatin solution containing 1cc of an aqueous 5% solution of sodium n-dodecyl benzene sulfonate, and a second emulsion of silver iodobromide containing, per 100g of the emulsion, 5.3g of gelatin and $5.3 \times 10^{-2}$ moles of silver. Onto the resulting coating, 100cc of an aqueous 5% gelatin solution containing 1.5cc of an aqueous 5% sodium n-dodecyl benzene sulfonate was further coated as a protective layer to a dry film thickness of 1$\mu$.

An image-receiving layer was prepared in the following manner.

A transparent cellulose triacetate support was coated with an aqueous solution of the following composition containing acetic acid in an amount sufficient to dissolve poly-4-vinyl pyridine:

| | |
|---|---|
| Poly(vinyl alcohol) (percent hydrolysis, 98%; degree of polymerization, 1800; Gehsenol NH-18; made by Nippon Gosei Kagaku Kogyo Co., Ltd.) | 3% |
| Poly 4 vinyl pyridine | 3% |

After the light-sensitive layer described above had been exposed to light at 20 c.m.s for one-twentieth second through an optical wedge, it was laid upon the image-receiving layer and developing transfer was effected at room temperature by spreading therebetween under pressure a treating liquid having the following composition:

| | |
|---|---|
| Water | 100cc |
| Potassium hydroxide | 11.2g |
| Hydroxyethyl cellulose | 4.0g |
| Benzotriazole | 3.5g |
| Potassium thiosulfate | 0.5g |
| Lithium nitrate | 0.5g |
| Zinc nitrate | 0.5g |
| N-benzyl-α-picolinium bromide | 2.3g |

After carrying out development for about 1 minute, the image-receiving layer was stripped off and thereafter subjected to a thorough rinsing with water. There was transferred to the image-receiving layer a yellow color image dependant upon the degree of exposure imparted. The spectral absorption of the resultant image obtained by the transfer where Compound (2) was present was determined in terms of transmission density, and the result obtained is given as curve 5.

Figure 3:
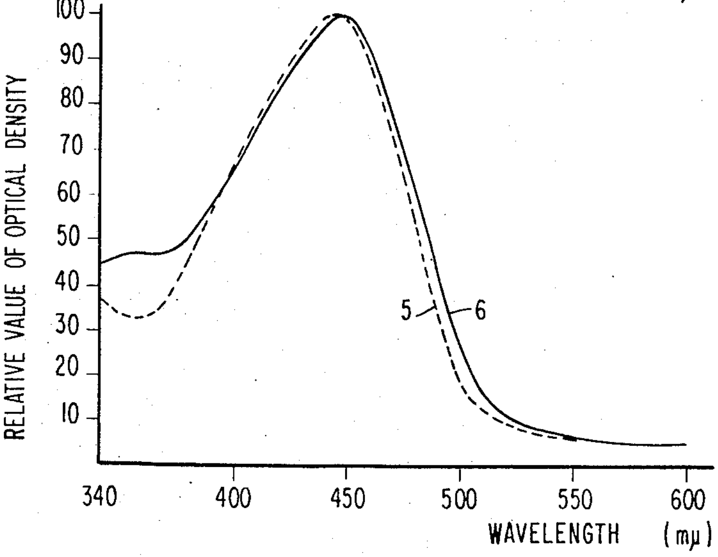

The spectral absorption curve of a transfer image formed in an identical operation but using compound (A) in place of of Compound 2 is given in FIG. 3 as curve 6.

Curves 5 and 6 in FIG. 3 which have peak values of 0.80 and 0.94, respectively, have been normalized so that the peak in both curves has the same value of 100.

The spectral absorption obtained by the transfer using Compound 2 shows less height in the skirt of the absorption curve at the longer wave side as compared to that obtained with the use of Compound (A) in a manner similar to that shown in FIG. 1, and hence it has a more desirable yellow color hue.

EXAMPLE 2

A cellulose triacetate support provided with a gelatin undercoat was successively coated with the following layers to form a light-sensitive layer.

1. Cyan dyestuff developer layer

A 15g portion of a cyan dyestuff developer, 1,4-bis(α-methyl-β-hydroquinonyl propylamino)-5,8-dihydroxyanthraquinone, was dissolved at 70°C in a solution containing 25cc of N,N-diethyl laurylamide, 25cc of methyl cyclohexanone and 1g of sodium diisooctyl-α-sulfosuccinate. The resulting solution was emulsified by dispersing it into 160cc of an aqueous 10% gelatin solution containing 10cc of an aqueous 5% sodium n-dodecyl benzene sulfonate solution. The resulting emulsion was further combined with water to increase its total volume to 50cc, and then coated to yield a dry film thickness of 5μ.

2. Red-sensitive emulsion layer

A red-sensitive layer containing a red-sensitive silver iodobromide emulsion of 5.0g of gelatin and $5.5 \times 10^{-2}$ moles of silver per 100g thereof, in which 3,3′-9-triethyl-5,5′-dichlorothiacarbocyanine iodide salt was added as a sensitizing dyestuff in a proportion of 4cc of a 0.1% methanolic solution per 100g of the emulsion, was coated to yield a dry film thickness of 3.5μ.

3. Intermediate layer

A formulation of 100cc of an aqueous 5% gelatin solution containing 1.5cc of an aqueous 5% sodium n-dodecyl benzene sulfonate solution was coated as an intermediate coating layer to yield a dry film thickness of 1.5μ.

4. Magenta dyestuff developer layer

A green-sensitive silver iodobromide emulsion of 4.7 $\times 10^{-2}$ moles of silver and 6.2g of gelatin per 100g of the emulsion, in which 3,3′, 9-triethyl-5,5′-diphenyloxacarbocyanine bromide salt was added as a sensitizing dyestuff in a proportion of 6cc of a 0.1% methanolic solution per 100g of the emulsion, was coated to give a dry thickness of 1.8μ.

6. Intermediate layer

One-hundred cc of an aqueous 5% gelatin solution containing 1.5cc of an aqueous 5% sodium n-dodecyl benzene sulfonate solution was coated to a dry film thickness of 1.0μ.

7. Yellow dyestuff developer layer

Into a solvent mixture comprising 10cc of N-n-butylacetanilide and 25cc of cyclohexanone there was dissolved 10g of a yellow dyestuff developer (Compound (2)) by heating at 70°C. The resultant solution was emulsified by dispersing it into 100cc of an aqueous 10% gelatin solution containing 8cc of an aqueous 5% sodium dodecyl benzene sulfonate solution. The emulsion so obtained was combined with 5cc of an aqueous 2% solution of 2-hydroxy-4,6-dichloro-S-triazine and water added to make the total volume 300cc. The resultant emulsion solution was coated to a dry film thickness of 1.5μ.

8. Blue-sensitive emulsion layer

A silver iodobromide emulsion containing $3.5 \times 10^{-2}$ moles silver and 6.5g gelatin per 100g thereof was coated to a dry film thickness of 1.5μ.

9. Protective layer

Into a solvent mixture comprising 10cc of a tri-o-cresyl phosphate and 10cc of ethyl acetate, 5g of 4′-methylphenyl hydroquinone was dissolved, and the solution so formed was emulsified by dispersing it into 10cc of an aqueous 10% gelatin solution containing 2cc of an aqueous 5% sodium n-dodecylbenzene sulfonate solution. A mixture of 10g of the emulsion so formed with 100cc of an aqueous 5% gelatin solution containing 5cc of 2% aqueous mucochloric acid was coated to a dry film thickness of 1μ.

The light-sensitive layer thus formed was wedge-exposed using blue light and then subjected to uniform overall exposure using green and red light. After exposure, developing transfer was carried out using the same light-receiving layer and the same treating liquid as were used in Example 1. There was obtained a yellow color image transferred to the image-receiving layer depending upon the degree of exposure imparted thereto.

As a result, it was found that a more desirable yellow color hue was obtained than when using compound (A) as the yellow dyestuff developer.

EXAMPLE 3

According to the procedure employed in Example 1 but using 2g of compound (6) instead of compound (2), a light-sensitive layer was formed. This layer was then exposed as in Example 1 and laid upon an image-receiving layer as described in Example 1, after which developing transfer was effected by spreading therebetween under pressure a treating liquid as described in Example 1. There was obtained a yellow image having a much more desirable color hue than when compound (A) was transferred thereto.

EXAMPLE 4

Using 2g of compound (8) in place of compound (2), a light-sensitive layer was prepared and treated according to the procedure of Example 1. There was obtained a yellow image having a much improved color hue as compared with the case of using compound (A).

While the invention has been described in detail and with reference to specific embodiments thereof, it will be apparent to one skilled in the art that various changes and modifications can be made therein without departing from the spirit and scope thereof.

What is claimed is:

1. A silver halide photographic material to be used for a diffusion transfer process characterized by the inclusion of a compound represented by the general formula:

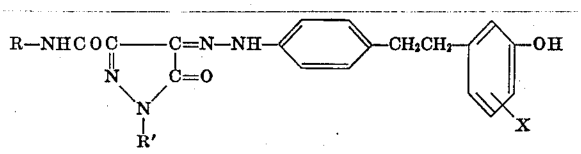

wherein R is an alkyl group containing four to seven carbon atoms, X is an hydroxyl group located in either the ortho- or para-position to the hydroxyl group and $R_1$ comprises an orthochlorophenyl group.

2. A silver halide photographic material as claimed in claim 1 wherein X is at the ortho position.

3. A silver halide photographic material as claimed in claim 1 wherein X is at the para-position.

4. A silver halide photographic material as claimed in claim 1 where the compound has the formula:

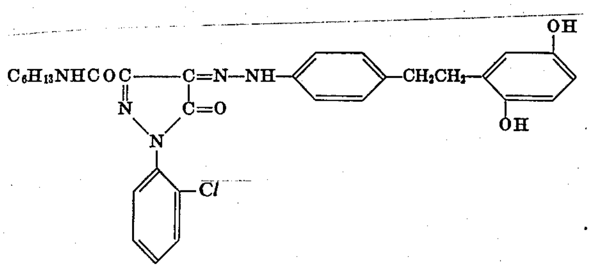

5. A silver halide photographic material as claimed in claim 1 where the compound has the formula:

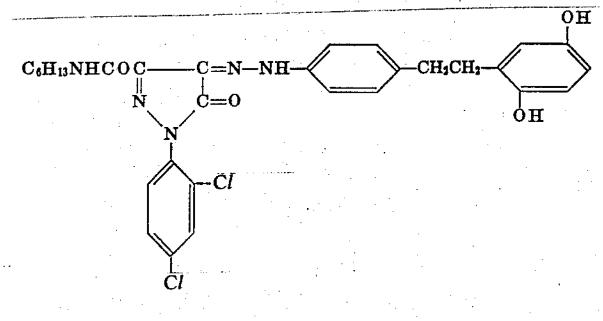

6. A silver halide photographic material as claimed in claim 1 where the compound has the formula:

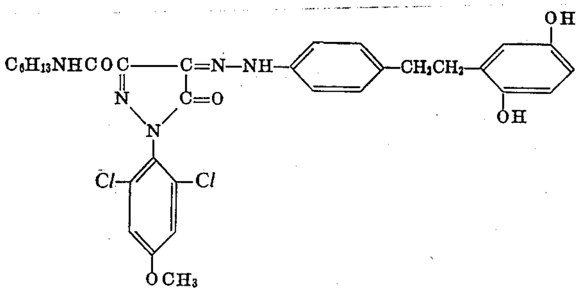

7. A silver halide photographic material as claimed in claim where the compound has the formula:

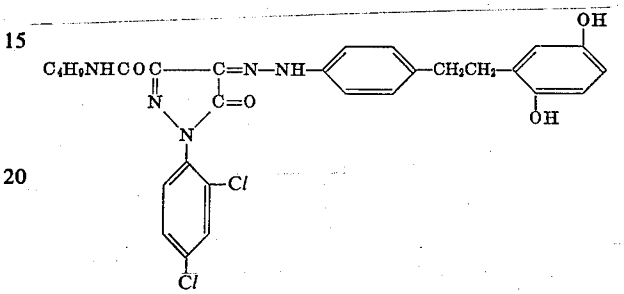

8. A silver halide photographic material as claimed in claim 1 wherein R is selected from the group consisting of butyl, sec-butyl, isobutyl, pentyl, hexyl, heptyl, 4-methylpentyl or 2-ethyl pentyl.

9. A silver halide photographic material as claimed in claim 1 wherein the compound is present in a silver halide emulsion layer.

10. A silver halide photographic material as claimed in claim 1 wherein the compound is present in a layer adjacent a silver halide emulsion layer.

11. A silver halide photographic material as claimed in claim 10 wherein the layer containing the compound is immediately under the silver halide emulsion layer.

12. A silver halide photographic material as claimed in claim 1 wherein the compound is present in a blue-sensitive silver halide emulsion layer or a layer adjacent thereto.

13. A silver halide photographic material as claimed in claim 12 wherein the molar ratio of the silver in the silver halide emulsion layer corresponding to a blue-sensitive layer to the dyestuff is from about 1.0 to about 15.0.

14. A silver halide photographic material as claimed in claim 13 wherein the molar ratio is from about 1.5 to about 5.5.

* * * * *